US007949514B2

(12) United States Patent
Pacull

(10) Patent No.: US 7,949,514 B2
(45) Date of Patent: May 24, 2011

(54) METHOD FOR BUILDING PARALLEL CORPORA

(75) Inventor: Francois Pacull, Crolles (FR)

(73) Assignee: Xerox Corporation, Norwalk, CT (US)

( * ) Notice: Subject to any disclaimer, the term of this patent is extended or adjusted under 35 U.S.C. 154(b) by 1068 days.

(21) Appl. No.: 11/789,089

(22) Filed: Apr. 20, 2007

(65) Prior Publication Data

US 2008/0262826 A1    Oct. 23, 2008

(51) Int. Cl.
*G06F 17/28* (2006.01)

(52) U.S. Cl. .............. 704/7; 704/2; 704/4; 704/5; 704/8

(58) Field of Classification Search .................. 704/2–10
See application file for complete search history.

(56) References Cited

U.S. PATENT DOCUMENTS

| | | | |
|---|---|---|---|
| 7,058,567 | B2 | 6/2006 | Aït-Mokhtar et al. |
| 7,146,358 | B1 * | 12/2006 | Gravano et al. ............ 1/1 |
| 7,562,082 | B2 * | 7/2009 | Zhou ......................... 1/1 |
| 2005/0138000 | A1 | 6/2005 | Roux et al. |
| 2005/0138556 | A1 | 6/2005 | Brun et al. |
| 2005/0228643 | A1 | 10/2005 | Munteanu et al. |
| 2006/0009963 | A1 | 1/2006 | Gaussier et al. |
| 2007/0011132 | A1 * | 1/2007 | Zhou et al. .................. 707/1 |
| 2008/0126076 | A1 * | 5/2008 | Ming et al. ................. 704/4 |

OTHER PUBLICATIONS

Aït-Mokhtar et al., Incremental Finite-State Parsing, *Proceedings of Applied Natural Language Processing*, Washington, Apr. 1997.
Aït-Mokhtar et al., Subject and Object Dependency Extraction Using Finite-State Transducers, *Proceedings ACL '97 Workshop on Information Extraction and the Building of Lexical Semantic Resources for NLP Applications*, Madrid, Jul. 1997.
Aït-Mokhtar et al., Robustness Beyond Shallowness: Incremental Dependency Parsing, *NLE Journal*, 2002.
Aït-Mokhtar et al., A Multi-Input Dual-Entry Point Dependency Parser, *Proceedings of Beijing*, IWPT, 2001.
P.Resnik, N.A.Smith, The Web as a Parallel Corpus, *Computational Linguistics*, vol. 29, No. 3, pp 349-380, Sep. 2003.
I.Shahzad, K.Ohtake, S.Masuyama, K.Yamamoto, Identifying Translations of Compound Nouns Using Non-Aligned Corpora, *Proceedings of the Workshop MAL '99*, pp. 108-113, 1999.
U.S. Appl. No. 11/013,366, filed Dec. 15, 2004, Brun, et al.
U.S. Appl. No. 11/018,758, filed Dec. 21, 2004, Brun, et al.
U.S. Appl. No. 11/018,892, filed Dec. 21, 2004, Brun, et al.
U.S. Appl. No. 11/173,136, filed Dec. 20, 2004, Sándor, et al.
U.S. Appl. No. 11/173,680, filed Dec. 20, 2004, Sándor, et al.
U.S. Appl. No. 11/202,549, filed Aug. 12, 2005, Brun.

(Continued)

*Primary Examiner* — Leonard Saint Cyr
(74) *Attorney, Agent, or Firm* — Fay Sharpe LLP

(57) ABSTRACT

A method for identifying documents for enriching a statistical translation tool includes retrieving a source document which is responsive to a source language query that may be specific to a selected domain. A set of text segments is extracted from the retrieved source document and translated into corresponding target language segments with a statistical translation tool to be enriched. Target language queries based on the target language segments are formulated. Sets of target documents responsive to the target language queries are retrieved. The sets of retrieved target documents are filtered, including identifying any candidate documents which meet a selection criterion that is based on co-occurrence of a document in a plurality of the sets. The candidate documents, where found, are compared with the retrieved source document for determining whether any of the candidate documents match the source document. Matching documents can then be stored and used at their turn in a training phase for enriching the translation tool.

22 Claims, 3 Drawing Sheets

OTHER PUBLICATIONS

U.S. Appl. No. 11/287,170, filed Nov. 23, 2005, Brun, et al.
U.S. Appl. No. 11/341,788, filed Jan. 27, 2006, Segond, et al.
U.S. Appl. No. 11/354,688, filed Feb. 15, 2006, Roulland, et al.
X.Ma, M.Y.Liberman, BITS: A Method for Bilingual Text Search Over the Web, *Machine Translation Summit VII*, Sep. 1999.
D.S.Munteanu, D. Marcu, Improving Machine Translation Performance by Exploiting Non-Parallel Corpora, *Computational Linguistics*, vol. 31, No. 4, pp. 477-504, Dec. 2006.
R.Rapp, Identifying Word Translations in Non-Parallel Texts, *Meeting of the Association for Computational Linguistics*, pp. 320-322, 1995.
J.Tomás, E.Sánchez-Villamil, J.Lloret, F.Casacuberta, WebMining: An Unsupervised Parallel Corpora Web Retrieval System, *Corpus Linguistics Conference*, 2005.
J.Fry, *Assembling a Parallel Corpus from RSS News Feeds*.
P.Resnik, *The STRAND Bilingual Databases*, http://www.umiacs.und.edu/~resnik/strand/, Jan. 2, 2007.
N.Cancedda, SMART: Research Directions, *Xerox Research Centre Europe*.
H.Déjean, E.Gaussier, J.M.Renders, F.Sadat, Automatic Processing of Multilingual Medical Terminology, *Xerox Research Centre Europe*.
L.Shi, C.Niu, M.Zhou, J.Gao, *A DOM Tree Alignment Model for Mining Parallel Data from the Web*.
Tanaka, Extraction of Lexical Translations from Non-Aligned Corpora, *International Conference on Computational Linguistics*, COLING '96, 1996.
P.Fung, *A Statistical View on Bilingual Lexicon Extraction: From Parallel Corpora to Non-Parallel Corpora*.

\* cited by examiner

METHOD FOR BUILDING PARALLEL CORPORA

BACKGROUND

The exemplary embodiment relates to the development of parallel corpora for a translation tool. It finds particular application in conjunction with a method for identifying documents in different languages which can be used for training the translation tool.

In the field of data-driven machine translation, it is desirable to obtain as much parallel data as possible about the pair of languages for which the translation system is built. Mutual translations of source and target language texts and text fragments are used as data to feed a learning engine, which builds models that are then used by an actual translation tool. Parallel texts, i.e., texts and text fragments that are mutual translations of each other, are an important resource in these applications.

Statistical translation systems use parallel or comparable corpora in the source and target language for training the system. Parallel text discovery systems have been developed for identifying pairs of sentences or text fragments which are translations of one another starting from collections of parallel or comparable documents. Parallel documents are those which are intended to be mutual, complete translations of each other. Comparable documents are documents which, while not being complete translations, have considerable overlap in their content.

Examples of parallel documents are to be found in specific domains, such as product documentation, and in political and legal documents. The availability of such documents in these specific domains is largely due to the desirability for the documents to be accessible to people from different countries. Building parallel corpora (i.e., sets of matched pairs of parallel documents) in these domains is thus relatively easy. However, using such specialized corpora for training translation tools introduces a bias in the translation. As will be appreciated, the vocabulary in common usage among members of the European Commission, for example, may be inappropriate for training a translation tool designed for translation of children's fairy tales.

Accordingly, it is desirable to identify parallel or comparable documents from other domains to improve the statistical translation tool by reducing the bias introduced from one domain and/or making it more applicable to another domain. Two techniques, known as STRAND (Structural Translation Recognition for Acquiring Natural Data) and BITS (Bilingual Internet Text Search) have been used to find multilingual sites on the Web which offer the same content in different languages. These techniques typically search for URLs which are similar except for information relating to the language or country. For example, two URLs http://.../fr/doc.html and http://.../de/doc.html may be detected (where "..." matches and includes a reference to the document). These two URLs could be assumed to contain French and German versions of the same document, respectively. Where the name of the document in the two URLS is not exactly the same but is sufficiently close to raise an expectation that it is the same document in two languages, this may be confirmed by verifying that the associated images are the same or the lengths of the two documents are approximately equal.

However, the names of the documents listed in the URLs often do not match sufficiently closely to be identified as being parallel. Further, the URL may lack an easily recognized reference to the document's language. There exist a large number of parallel documents on the Web which are not easily identified as such because the two documents are posted by entirely different websites.

While parallel documents may be identified by following all references in a website in order to find a document in another language and then verifying if it is a translation of the initial one, such a process is computationally expensive because following links in a blind manner can lead to a huge space of document pairs to consider. Further, documents written in different languages hosted by different websites that are not related explicitly generally escape detection.

A need exists for an automated method for readily identifying parallel documents on the web which may be used for enriching a translation tool.

INCORPORATION BY REFERENCE

The following references, the disclosures of which are incorporated by reference herein in their entireties, are mentioned:

U.S. Published Application No. 20050228643, published Oct. 13, 2005, entitled DISCOVERY OF PARALLEL TEXT PORTIONS IN COMPARABLE COLLECTIONS OF CORPORA AND TRAINING USING COMPARABLE TEXTS, by Munteanu, et al., discloses a translation training device which extracts a set of parallel sentences from two nonparallel corpora. The system finds parameters between different sentences or phrases, in order to find parallel sentences. The parallel sentences are then used for training a data-driven machine translation system. The process can be applied repetitively until sufficient data is collected or until the performance of the translation system stops improving.

U.S. Published Application No. 20060009963, published Jan. 12, 2006, entitled METHOD AND APPARATUS FOR IDENTIFYING BILINGUAL LEXICONS IN COMPARABLE CORPORA, by Gaussier, et al., discloses methods formulated using a geometric interpretation for identifying bilingual pairs in comparable corpora using a bilingual dictionary. The methods may be used separately or in combination to compute the similarity between bilingual pairs.

Methods for extracting bilingual lexicons from parallel or comparable corpora are described, for example, in the following publications: Philip Resnik, Noah A. Smith, "The Web as a Parallel Corpus," in Computational Linguistics 29 (3), pp. 349-380, September 2003 (Hereinafter "Resnik, et al."); Xiaoyi Ma and Mark Liberman, "Bits: A Method for Bilingual Text Search Over the Web, in Machine Translation Summit VII, September 1999 (Hereinafter "Ma, et al."); Dragos Munteanu and Daniel Marcu. "Improving Machine Translation Performance by Exploiting Comparable Corpora," in Computational Linguistics, 31 (4), pp. 477-504, December 2005; Rapp, "Identifying Word Translations In Nonparallel Texts," in Proceedings of the Annual Meeting of the Association for Computational Linguistics, 1995; Peters, et al., "Capturing The Comparable: A System For Querying Comparable Text Corpora," in JADT'95—3rd International Conference on Statistical Analysis of Textual Data, pages 255-262, 1995; Tanaka et al., "Extraction Of Lexical Translations From Non-Aligned Corpora," in International Conference on Computational Linguistics, COLING '96, 1996; Shahzad, et al., "Identifying Translations Of Compound Nouns Using Non-Aligned Corpora," in Proceedings of the Workshop MAL'99, pp. 108-113, 1999; Fung, et al., "A Statistical View On Bilingual Lexicon Extraction—From Parallel Corpora To Nonparallel Corpora," in J. Veronis, editor, Parallel Text Processing, Kluwer Academic Publishers, 2000; and Tomás, et al., "Web- Mining: An Unsupervised Parallel Corpora Web Retrieval System," Corpus Linguistics 2005 Conf.

BRIEF DESCRIPTION

In accordance with one aspect of the exemplary embodiment, a method for identifying documents for enriching a statistical translation tool includes retrieving at least one source document which is responsive to a source language query. For each retrieved source document, a set of text segments is extracted from the retrieved source document. The extracted text segments are translated into target language segments with a statistical translation tool to be enriched. Target language queries based on the target language segments are formulated. For each of a plurality of the target language queries, a set of target documents is retrieved responsive to the target language query. The sets of retrieved target documents that are responsive to the target language queries are filtered. The filtering includes identifying candidate documents which meet a selection criterion that is based on co-occurrence of a document in a plurality of the sets. The identified candidate documents are compared with the retrieved source document for determining whether any of the candidate documents match the source document.

In accordance with another aspect, a system for enriching a statistical translation tool includes memory which stores instructions for retrieving at least one source document which is responsive to a source language query, for each retrieved source document, extracting a set of text segments from the retrieved source document, translating the extracted text segments into target language segments with a statistical translation tool, formulating target language queries based on the target language segments, retrieving target documents responsive to the target language queries, filtering the retrieved target documents that are responsive to the target language queries, the filtering including identifying candidate documents from the target documents that are responsive to a preselected minimum amount of queries, comparing the candidate documents with the retrieved source document for identifying whether any of the candidate documents match the source document, and enriching the translation tool with aligned text fragments from matching source and target documents. The system further includes a processor which executes the instructions.

In another aspect a method for enriching a statistical translation tool includes, for each of a plurality of source documents in a target language: extracting a set of text segments from the source document, translating the extracted text segments into target language segments with a statistical translation tool, formulating target language queries, each query being based on one of the target language segments, retrieving target documents responsive to the target language queries, and filtering the retrieved target documents that are responsive to the target language queries, the filtering including identifying candidate documents from among the retrieved target documents which are meet a selection criterion. The selection criterion is based on a measure of the queries to which a document is retrieved as being responsive. The candidate documents which meet the selection criterion are compared with the retrieved source document for identifying whether any of the candidate documents match the source document. The translation tool is enriched by learning from aligned text fragments from the matched source and target documents.

DETAILED DESCRIPTION

Figure 1:
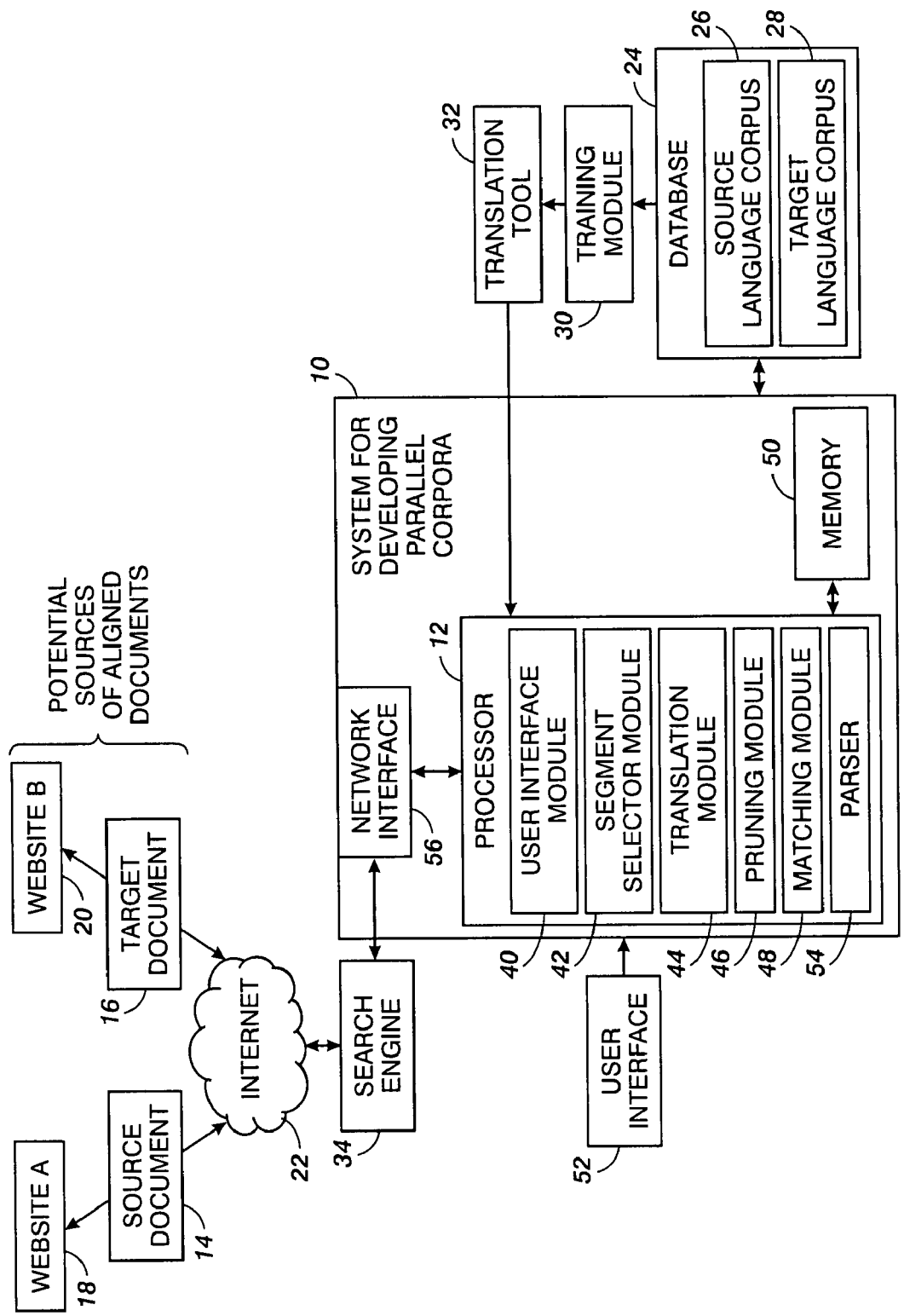
FIG. 1 is a functional block diagram of an environment in which a system for developing parallel corpora may operate.

The exemplary embodiment provides a system and a method for developing parallel corpora which may be utilized for enriching a statistical translation tool. The exemplary method allows pairs of matched documents, which may be located in different web sites, to be identified.

As used herein, a "text fragment" may be any combination of natural language symbols that may, for example, specify a term, word, phrase, or sentence, or any combination or portion thereof.

Parallel corpora comprise data, such as a set of documents, paragraphs, sentences, and the like, in which a text fragment from one corpus has been determined to have a chance of having the same meaning as a text fragment from another corpus. For convenience, unless otherwise noted, the term "parallel corpora," as used herein, refers to corpora containing parallel documents, comparable documents, or mixtures thereof. Parallel documents are documents which have been determined to be close translations of each other. Comparable documents are documents which although not a direct translation, have considerable overlap in their content, for example by having a plurality of pairs of text fragments having the same meaning or discussing the same subject. While particular reference is made herein to "parallel documents" it is to be appreciated that the method are also applicable to a pair of comparable documents. The documents may include electronic documents in any form, such as web documents, newsfeeds, scanned documents, and machine readable information of any kind and from any source. In general, the documents will be described herein as comprising web pages.

In various aspects, the method includes using a biased statistical translation tool (generally, one which has been trained on a limited number of documents and/or documents from a specific domain) to build parallel corpora or comparable corpora automatically from the web, and to use the developed corpora to train the statistical translation tool in domains that are not initially covered by the translation tool. The method seeks to identify documents with the same content written in different natural languages, such as French, English, German, Chinese, Russian, etc. Such documents exist on the Web and may be used to enrich the translation tool, provided that a pair of documents in the two languages under consideration can be found and it can be verified that the two documents match. If the match is perfect (i.e., the same document in two languages) the documents can be used to build parallel corpora. If the match is imperfect (e.g., two documents about the same subject) the documents can be used to build comparable corpora.

In general, the method includes two phases. The first phase includes detecting candidate pairs of documents and the second phase includes verifying that the documents comprise matching (e.g., the same or closely aligned) documents in two languages. The second, verification phase may employ existing algorithms, such as those employed in STRAND and BITS and described, for example, in Resnik, et al., Ma, et al., and U.S. Pub. No. 20050228643, incorporated herein by reference, to determine an alignment between a pair of source and target documents. Finally, the method includes using the alignment of the documents where one exists, to train the translation tool.

With reference to FIG. 1, a block diagram of an environment in which an exemplary system 10 for developing parallel corpora operates, is shown. The system 10 includes a processor 12 which receives data 14, 16 from various sources 18, 20. The data 14, 16 may include documents in various languages. The sources 18, 20 may include various websites accessed via a wide area network, such as the Internet 22. The processor 12 processes the data to produce a database 24, which includes parallel monolingual corpora 26, 28. The corpora may be used by a training module 30 to train a statistical translation tool 32, suitable for use in machine translation, which takes as input text in a source language and outputs a statistical translation of the text in a target language. The system 10 is used to provide parallel documents for training the tool 32, which prior to training, is a biased tool that has been trained on training materials, dictionaries, glossaries, product, manuals, reports of multilingual committees, human-created translations, and/or other known parallel data. The translation tool 32, once trained, may be utilized for example, for translation of blocks of text comprising multiple sentences or as an adjunct to a speech recognition device, or for translation of short words or phrases, or the like.

The parallel monolingual corpora 26, 28 each contain documents in a respective language. The two languages are herein illustrated as source and target languages, although in practice either corpus 26, 28 may serve as the source or target language corpus.

Figure 2:
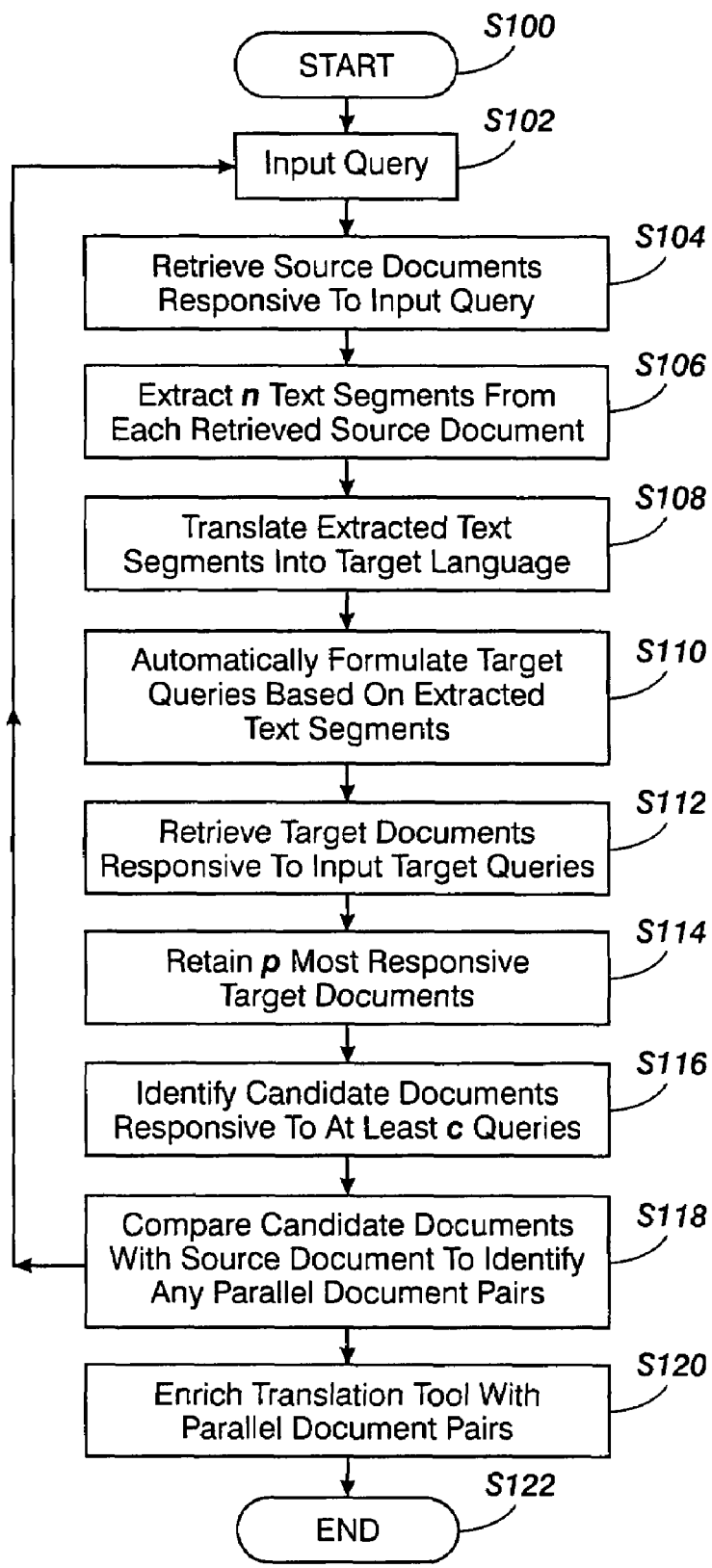
FIG. 2 illustrates an exemplary method for developing parallel corpora.

The illustrated processor 12 includes a number of processing modules which are utilized in performing the exemplary method and whose functions are therefore best understood with reference to the method described herein and illustrated in FIG. 2. Only a brief description of the processing modules is therefore provided at this stage. In general, the processor 12 uses web-based queries to identify source language documents in a source language. Each original source language document, when translated by the translation tool, becomes a source of multiple new queries in the target language for retrieving target language documents. Each of these retrieved target language documents may or may not be a translation of the retrieved source language document. The processor 12 selects a subset of these target language documents and computes a matching with the original target language document to identify a candidate translation In particular, the processor 12 utilizes one or more search engines 34, for retrieving web pages, 14, 16, which may include aligned source and target documents, from respective websites 18, 20, via the Internet 22.

The illustrated processor includes a user interface module 40, a segment selector module 42, a translation module 44, a pruning module 46, and a matching module 48. Each of the modules may be in the form of software which includes instructions for performing the exemplary method, which may be stored in associated memory 50. However, it is to be appreciated that the functions of two or more of the modules may be combined or distributed among processing modules.

The user interface module 40 communicates with a user interface 52, such as a graphical user interface (GUI), which allows a user to interact with the processor to develop a query for retrieving documents in the source and target languages. The user interface 52 may include a user input device, such as a keyboard, keypad, mouse, touch screen input device, or combination thereof, and a display, such as an LCD screen or computer monitor. For example, the user interface 52 may be configured to display a domain selection window on the display whereby a user may select a particular domain for enrichment of the translation tool 32, such as sports, literature, science, news, or a more specific domain, such as boxing, golf, or soccer, within the sports domain. The user interface 52 may further display a window in which the user enters a search query in the source language. Alternatively, suitable queries may be stored in memory, such as memory 50. The query may comprise any natural language query in the source language aimed at retrieving documents.

The user interface module 40 interacts with a search engine 54 for defining the query and retrieving documents in the source language. The segment selector module 42 automatically selects text segments from the retrieved documents. The translation module 44 utilizes the translation tool to translate the selected text segments and formulates new queries in the target language based on the translated text segments. The pruning module 46 prunes sets of retrieved documents responsive to the new queries to identify a subset of relevant candidate documents. The matching module 48 checks the subset of candidate documents to identify whether one (or more) of the candidate documents forms, with the original retrieved document in the source language, a matching pair of documents which can be added to the parallel corpora and used to enrich the translation tool.

The training module 30 identifies text fragments in the two different natural languages present in the monolingual corpora 26, 28 that are probable matches. These text fragments may be sentences, segments of sentences, or words. These matching text fragments may be used to train the translation tool 30.

The system 10 may further include or access a language processing module 54, such as a tokenizer. The tokenizer 54 takes as input text of a digital document and tokenizes the document to identify the words and punctuation it contains and may further determine the structure of the document, such as paragraphs, section headings, and the like. An exemplary tokenizer may be incorporated in an incremental parser, such as the Xerox Incremental Parser (XIP), as described, for example, in U.S. Published Application No. 20050138556, entitled CREATION OF NORMALIZED SUMMARIES USING COMMON DOMAIN MODELS FOR INPUT TEXT ANALYSIS AND OUTPUT TEXT GENERATION, by Brun, et al., and U.S. Pat. No. 7,058,567, issued Jun. 6, 2006, entitled NATURAL LANGUAGE PARSER, by Aït-Mokhtar, et al., the disclosures of which are incorporated herein in their entireties, by reference. These parsers include a substantial language processing functionality, much of which may not generally be required in performing the methods described herein.

The system 10 may be embodied in a computing device, such as a personal computer, e.g., a desktop, a laptop, palmtop computer, portable digital assistant (PDA), cellular telephone, pager, or other general purpose or dedicated computer device. The computing device may include the memory 50, which stores instructions executed by the processing components 40, 42, 44, 46, 48 in performing the exemplary method described herein. The memory 50 may represent any type of computer readable medium such as random access memory (RAM), read only memory (ROM), magnetic disk or tape, optical disk, flash memory, or holographic memory. In one embodiment, the memory 50 comprises a combination of random access memory and read only memory. In some embodiments, the processing components of the system 10 and memory 50 may be combined in a single chip. A network interface 56 allows the computer to communicate with one or more web sites, such as websites 18, 20 via the Internet 22, and may comprise a modulator/demodulator (MODEM). Prior to enrichment, the exemplary translation tool 32 may operate with minimal resources, such as one or more bilingual lexicons, e.g. a dictionary, and/or a small amount of parallel data. As an example, system 10 may comprise a biased statistical translating tool 32, such as an English/French system that has been trained using speeches of Canadian Parliament members.

FIG. 2 shows a flow diagram of an exemplary method for enriching the aligned corpora which may be performed with the system 10 of FIG. 1. As will be appreciated, the method may include fewer, more or different steps and that the steps need not be performed in the order illustrated. The method begins at S100.

At the start of the exemplary method, the vocabulary in the database 24 may be biased toward a particular domain, politics in the exemplary embodiment. The vocabulary may thus be quite far from the language of the layman. By enriching the model by adding training data from a variety other domains, a more generally applicable database 24 can be developed. Or, the database 24 may be enriched to make it more applicable to a specific domain, such as sports, entertainment, children's literature, science, or other domain in which a specific enriched vocabulary may be advantageous. As an example of the exemplary method, the addition of a sports vocabulary is given.

At S102, a user inputs a source query which can be any natural language query. The query may make reference to the domain or to concepts associated with the domain. The query is generally formulated in the source language such that the source documents are retrieved in the source language, although occasionally, non-source language documents may be retrieved. For example, one or more queries are input to a search engine 32, such as Google™. The query may be input by a user via the interface 52, with a view to retrieving a limited set of documents 14 in the form of web pages. The queries may be input using domain-specific vocabulary. In the illustrated embodiment, the queries may be input using vocabulary related to sports. At S104, one or more source documents 14 are retrieved which are responsive to a source language query.

Figure 3:
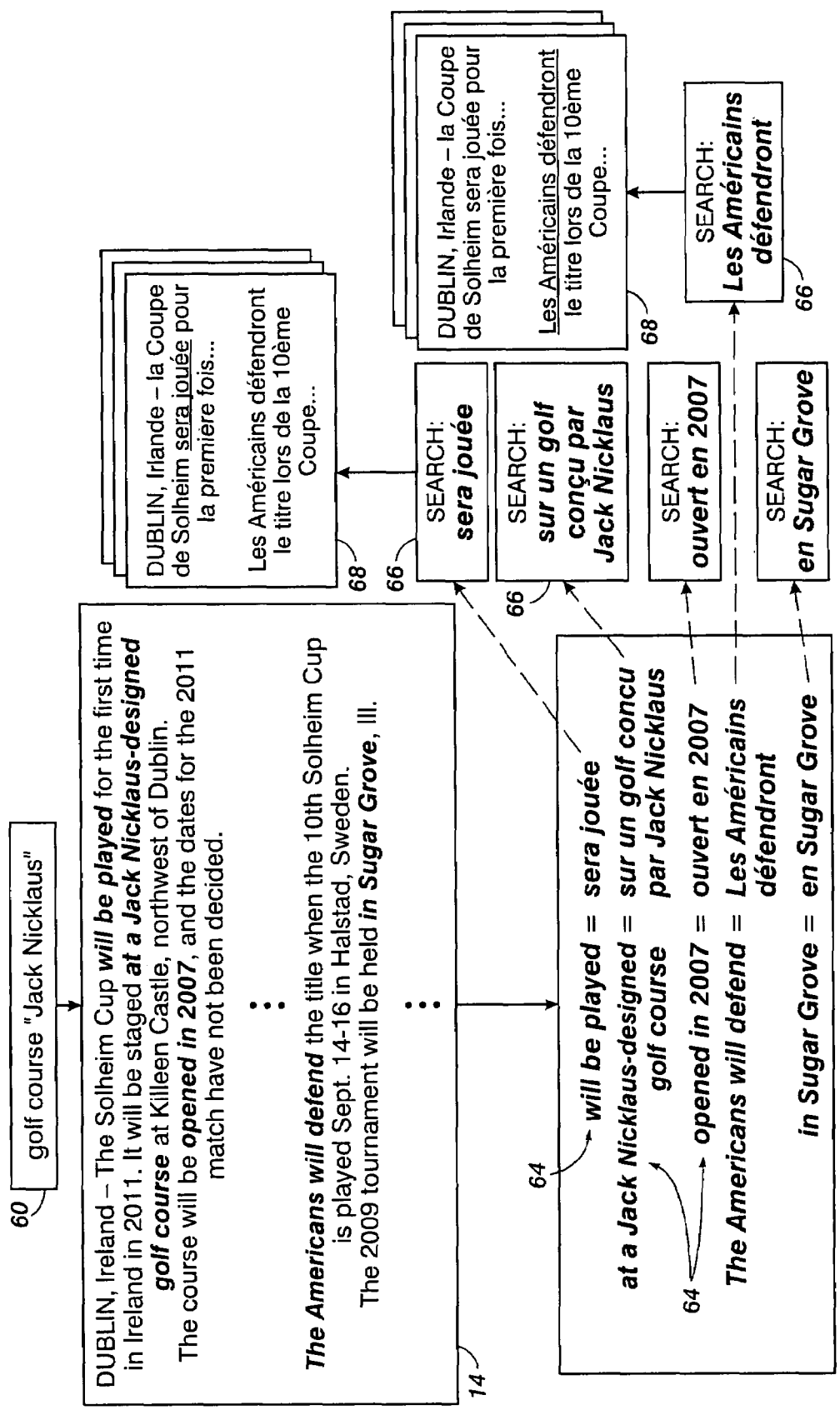
FIG. 3 graphically illustrates queries input and documents retrieved in the exemplary method of FIG. 2.

For example, as shown in FIG. 3, an exemplary query 60 relating to golf may be input by the user via the GUI 52. The query or queries may be input in one of the two languages in the database, which will be referred to as the source language, although it is to be appreciated that the corpora 26, 28 may be used interchangeably as source and target corpora in subsequent uses of the database. For each query 60, a set of documents 14 is retrieved from one or more websites 18. FIG. 3 illustrates one exemplary English language document 14 which might be retrieved using the exemplary English language query 60. As will be appreciated, the query may be modified by the user or by the search engine 34 to expand or reduce the number of responsive documents in the set. The number of documents retrieved at this stage may usefully be from about 1 to about 100 documents, e.g., about 10 documents.

The documents 14 may be retrieved from one or more different websites 18. Responsive documents may include those which include all or some of the query words in the exact format of the query or those which include equivalents of the query words, such as plurals, lemma forms thereof or the like, depending on the parameters of the input query 60 or by operation of the search engine 34.

At S106, for each retrieved source document 14, a set of text segments 64 is extracted from the retrieved source document 14. For example, for each responsive document 14 in the set of documents retrieved at S104, a plurality of n text segments is extracted from the document, where n can be, for example, at least two, e.g., at last three and in general, from about 5 to about 50, such as at least about 10. In one embodiment, the same number n of text segments is extracted from each of the retrieved documents 14. In other embodiments, the number n of retrieved text segments 64 is generally proportional to the length of the document 14. This step may be performed automatically, by the segment selector module 42, optionally utilizing the tokenizer 54 for identifying sentences and the sequence of tokens making up each sentence.

Each text segment may include a text fragment of at least two words, e.g., at least about three words and, in general, substantially less than the entire document. The text segment is generally a set of contiguous words. For example, the extracted text segments 64 may each be a sentence, phrase, or a couple of words. In one embodiment, the selected text segments may be substantially randomly distributed throughout the document 14. For example, one sentence may be selected at random from each paragraph. Alternatively, some other procedure may be established for selecting text segments throughout at least a portion of the document, such as the first sentence of each paragraph, or every tenth sentence, or the first phrase on each page, or the like. In some embodiments, the extracted text segments are spaced from each other by other document text and together make up a minority of the document. The extracted segments from a document 14 may be all of a preset length or may be of different lengths. In some embodiments, the parser is utilized to identify phrases, which may be randomly distributed, each phrase comprising a group of grammatically-related words.

At S108, each of the extracted text segments 64 is translated by the translation module 44, using the biased statistical translation tool 32. This yields pairs of text segments, one (the extracted text segment 60) in the first, e.g., source language and the other (the translated text segment 66) in the second, e.g., target language. The translated text segment 66 may include one or more words in the target language. In some cases, the translation tool 32 may output multiple translated text segments in the target language, each one corresponding to the input text segment. Each of these one or more translated text segments 66 may be utilized in the subsequent step.

At S110, queries are formulated based on the translated text segments. Each query may be based on a single translated text segment 66, although it is also contemplated that queries may be based on two or more of the text segments. These queries are generated automatically by the translation module 44. The queries are input to a search engine, such as the same search engine 34 used in the initial search. The search engine 34 may be requested to return responsive documents only in the target language (e.g., by searching among those documents which are indexed as being in the target language or by ranking the documents according to their language). Or a domain specific search engine may be utilized. In one embodiment, the query includes the full segment 66 as the query, for example, by placing the segment in quotes. In general, the search is constructed to maximize the number of words in the translated segment 66 that are found in the responsive documents.

At S112, target documents 68, that are responsive to the target language queries 66, are retrieved. These may be stored in a cache in temporary memory 50. For each query, a set of documents may be retrieved. Each set may include one or more documents. Of course, some queries may retrieve no documents, i.e., and empty set. In general, for the method to proceed, at least some of the queries retrieve at least one document.

In subsequent step(s) the retrieved target documents that are responsive to the target language queries are filtered to identify candidate documents which meet a selection criterion that is based on a measure of the co-occurrence of documents. By co-occurrence, it is meant that a retrieved document is among those responsive to at least two of the target language queries, i.e., appears in at least two of the sets of retrieved target documents. In one embodiment, the search results are optionally first filtered at S114 to identify a subset of documents for each query 66. The subset of filtered documents may include only the most responsive documents. In one embodiment a preselected maximum number p of the most relevant documents is retained for each translated segment. The value of p may be for example, from about 10 to 100. However, p may be higher, if the number of retrieved documents can be readily processed with the computational capabilities of the processor 12. Relevance may be based on any suitable criteria based on the input query, such as whether the entire segment appears and/or whether individual words in the segment appear. The search engine output order may be used to define the set if the search engine 34 is one which ranks documents 16 according to the presence of the query words.

In some embodiments, extrinsic information, such as publication dates, authors and the like may be utilized in the filtration stage. However, comparable documents may often have slightly different publication dates and different authors, for example, when a news article is made available on the web by one news service on one day and is translated and modified slightly by another news service on another day. Accordingly, such filtration techniques may eliminate some potentially useful documents.

From the subsets of filtered documents 16 output at S114, or, if no filtering is performed, using the entire sets of retrieved documents output at S112, candidate documents in the target language may be identified which meet a preselected minimum co-occurrence criterion (S116). As discussed above, the co-occurrence criterion is based on a measure of the number of the queries 66 (e.g., after filtering at step S114) which retrieve the same document. If the search has been properly constructed, a candidate retrieved document includes a plurality of the target language segments from the same source document which have been used to formulate the queries. In general, the co-occurrence rules specify that a candidate document is one which is responsive to a minimum quantity of the target language queries, where the quantity can be expressed as a minimum number of the target language queries and/or as a minimum percentage of the target language queries.

For example, the candidate documents are those that appear at least c times, i.e., at least an amount c of the searches 66 retrieve the particular document 16. The value of c may depend on the number of queries 66 developed for the original document. For example, where ten queries 66 are developed, c may be from about 2 to about 8, e.g., from 3 to 7, or expressed as a proportion, c may be at least 20%, or at least 30% or at least 70%. A suitable value of c, which is relatively low, may be established for the domain in an initial training phase. As the statistical translation tool 32 becomes refined with data from the domain, the value of c may be increased, since the tool will be more likely to use-domain appropriate translations at S108. As will be appreciated, in some cases, none of the retrieved documents 16 may meet the co-occurrence selection criteria at S116, because, for example, no translation of the source document 14 may exist in the target language on the web, or because the translation tool 32 is not yet sufficiently trained for the domain. In such cases, all the documents 16 may be discarded.

The source document 14 and candidate document or documents 16 identified at S116 have a good chance of being matching documents written in different languages because the translated version corresponds to the source version for a significant number of segments distributed throughout the document.

At S118, the candidate documents 16 which meet the co-occurrence criteria are then compared with the retrieved source document 14 for identifying any matching source and target documents. Having reduced the set of target documents to a small number of candidate documents at S116, the candidate documents may be readily filtered in order to keep only the candidate pairs of source and target documents which correspond to matching documents: i.e., the same document (for parallel corpora) or comparable documents (for comparable corpora) in two languages. This last filtering step may be performed using the methods proposed, for example, in STRAND or BITS, as described by Resnik, et al. and Ma, et al. Techniques for determining whether two documents are translations of each other include comparing the length of the documents, comparing the number of paragraphs in each, determining if each document includes the same number of figures, tables, references, chapter headings, identification of speaker, and the like. Further details of these techniques are described, for example, in Chapter 2.1.3 of Resnik, et al.

Steps S106-SS118 are repeated for other source documents retrieved in response to the input query.

At S120, the pairs of documents output at S118 may be used to enrich the translation tool 32. In general, each corpus in database 18 may include a plurality of different items, such as articles, and other written information. In training the translation tool, pairs of aligned documents or other articles are selected. Each article pair is analyzed to determine possible sentence pairs. The candidate sentence pairs obtained may be analyzed using a dictionary and a maximum entropy classifier which produces a determination indicative of whether the sentences in each pair are mutual translations of one another. The output is parallel text fragments which can be used for training the translation tool. This step may be performed as described, for example, in U.S. Pub. No. 20050228643, incorporated herein by reference.

The identification of possible sentence pairs may include first trying to align the documents paragraph by paragraph. Once paragraphs are aligned, sentences in the paragraph are aligned and finally chunks of the sentence comprising a few words are aligned. All of these steps may be performed automatically by the training module. The method may end at S122 or may return to S102 for further iterations of the method.

The exemplary method may be performed in stages, each stage aimed at further refining the translation tool 32, e.g., until no appreciable further refinement is achieved. For example, the first results obtained can be used to train the biased translation tool 32. The translation tool 32, enriched with the domain-specific text fragments gleaned in the first round, can be used to translate the segments 64 of the source documents 14 (S106) retrieved in the second round), in order to obtain better results in the next round. This is a kind of "bootstrap" that allows the system to correct the imperfections of the translation tool on the fly.

For example, in the first stage, the translation tool may be trained at S118 on about 4-20 documents, such as at least about 12 documents in the particular domain of interest, such as sport. At the second stage, the enrichment of the training corpus provided by these documents has a good chance of improving the recall for other pairs of documents related to sport. The process can be applied repetitively until sufficient data is collected or until the performance of the translation tool 24 stops improving. With each repetition of the process, the training corpus is generally increased in size and thus is likely to result in a less biased translation tool.

As will be appreciated, the values selected for parameters n, p, and c can affect the accuracy of the system. Additionally, modification of these parameters can increase the number of document pairs found but this may be at a higher computation cost. Moreover, for different domains, different parameters may be appropriate. Accordingly, it is appropriate to run tests to determine appropriate values of the parameters n, p, c in a particular domain. Additionally, as the translation tool 32 is enriched with the results of the exemplary method, it may be appropriate to modify the parameters n, p, c. For example, the value of c may be increased. Such parameters can be easily modified during the process of acquiring new vocabulary in a given domain (e.g., sport) to find a trade off between the recall and the noise.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for identifying documents for enriching a statistical translation tool comprising:
retrieving, by a processor, at least one source document which is responsive to a source language query;
for each retrieved source document:
extracting a set of text segments from the retrieved source document;
translating the extracted text segments into target language segments with a statistical translation tool to be enriched;
formulating target language queries based on the target language segments;
for each of a plurality of the target language queries, retrieving a set of target documents responsive to the target language query;
filtering the sets of retrieved target documents that are responsive to the target language queries, the filtering including identifying candidate documents which meet a selection criterion that is based on co-occurrence of a target document in a plurality of the sets; and
comparing the candidate documents with the retrieved source document for determining whether any of the candidate documents match the source document.

2. The method of claim 1, further comprising, where a candidate document is determined to match the source document, enriching the translation tool with aligned text fragments from matched source and target documents.

3. The method of claim 2, further comprising:
utilizing the enriched translation tool to translate additional extracted text segments for retrieving additional target documents responsive to target language queries.

4. The method of claim 1, wherein the source language query relates to a particular domain in which the statistical training tool is to be enriched.

5. The method of claim 1, wherein the retrieving at least one source document which is responsive to the source language query includes inputting the query to a search engine for retrieving web-based documents.

6. The method of claim 1, wherein the extracting of the set of text segments from the retrieved source document comprises automatically extracting text segments throughout the document.

7. The method of claim 1, wherein the extracting of the set of text segments from the retrieved source document comprises extracting at least a preselected minimum number of text segments from the retrieved source document.

8. The method of claim 7, wherein the extracted text segments together comprise less than the entire document.

9. The method of claim 1, wherein the extracting of the set of text segments from the retrieved source document comprises extracting text segments spaced from each other by document text.

10. The method of claim 1, wherein the extracting of the set of text segments from the retrieved source document comprises extracting text segments substantially at random from at least a portion of the retrieved source document.

11. The method of claim 1, wherein the identifying of candidate documents which meet a selection criterion comprises identifying target documents which are retrieved as being responsive to at least a preselected minimum quantity of the target language queries.

12. The method of claim 11, wherein the identifying of candidate documents which meet a selection criterion comprises identifying any target documents which are retrieved as being each responsive to at least two of the target language queries.

13. The method of claim 11, wherein the method further includes, after the enriching, repeating the extracting, translating, formulating, retrieving and filtering, wherein the translating is performed with the enriched translation tool and wherein the minimum quantity is increased.

14. The method of claim 1, wherein the retrieving target documents responsive to the target language queries includes inputting the target language queries to a search engine for retrieving web-based documents.

15. The method of claim 1, wherein the filtering of the retrieved target documents that are responsive to the target language queries further comprises selecting a subset of documents most responsive to the query based on a ranking provided by a search engine which retrieves the target documents.

16. The method of claim 1, wherein the extracting of the set of text segments from the retrieved source document, translating the extracted text segments into target language segments, formulating target language queries based on the target language segments, retrieving target documents responsive to the target language queries, and filtering the retrieved target documents that are responsive to the target language queries, are computer implemented.

17. The method of claim 1, wherein the text segments are selected from phrases, sentences, groups of at least two words, and combinations and multiples thereof.

18. A non-transitory computer program product encoding instructions, which when executed on a computer causes the computer to perform the method of claim 1.

19. A system for enriching a statistical translation tool comprising:
  memory which stores instructions for:
    retrieving at least one source document which is responsive to a source language query;
    for each retrieved source document, extracting a set of text segments from the retrieved source document;
    translating the extracted text segments into target language segments with a statistical translation tool;
    for each of a plurality of the translated target language segments:
      formulating a target language query based on the target language segment; and
      retrieving a set target documents responsive to the target language query;
    filtering the sets of retrieved target documents that are responsive to the target language queries, the filtering including identifying candidate documents from the target documents that are each responsive to a preselected minimum amount of the plurality of queries, the minimum amount ensuring that the same document appears in at least two or at least 20% of the sets of retrieved target documents;
    comparing the candidate documents with the retrieved source document for identifying whether any of the candidate documents match the source document; and
    enriching the translation tool with aligned text fragments from matching source and target documents; and
  a processor which executes the instructions.

20. A method for enriching a statistical translation tool comprising:
  for each of a plurality of source documents in a target language:
    extracting, by a processor, a set of n text segments from the source document, where n is at least 10;
    translating each of the extracted text segments into a target language segment with a statistical translation tool;
    formulating n target language queries, each query being based on a respective one of the target language segments;
    retrieving target documents responsive to the target language queries; and
    filtering the retrieved target documents that are responsive to the target language queries, the filtering including identifying candidate documents from among the retrieved target documents which are meet a selection criterion, the selection criterion being based on a measure of the amount of the queries to which a same document is retrieved as being responsive, where the selection criterion requires a threshold amount c of the queries to which a same document is responsive to be at least 20% of n; and
    comparing the candidate documents which meet the selection criterion with the retrieved source document for identifying whether any of the candidate documents match the source document; and
  enriching the translation tool with aligned text fragments from the matched source and target documents.

21. The method of claim 20, wherein the method further includes, after the enriching, repeating the extracting, translating, formulating, retrieving and filtering, wherein the translating is performed with the enriched translation tool and wherein the threshold number c is increased.

22. The method of claim 20, wherein the same number n of text segments is extracted from each of the documents.

* * * * *